United States Patent
Tang

(10) Patent No.: US 10,897,338 B2
(45) Date of Patent: Jan. 19, 2021

(54) DATA TRANSMISSION METHOD, CHANNEL ESTIMATION METHOD, AND APPARATUS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/172,258

(22) Filed: Oct. 26, 2018

(65) Prior Publication Data

US 2019/0068336 A1 Feb. 28, 2019

Related U.S. Application Data

(63) Continuation of application No. PCT/CN2016/100568, filed on Sep. 28, 2016.

(51) Int. Cl.
| | |
|---|---|
| *H04L 5/00* | (2006.01) |
| *H04B 7/06* | (2006.01) |
| *H04W 72/04* | (2009.01) |
| *H04L 1/18* | (2006.01) |

(52) U.S. Cl.
CPC ........... *H04L 5/005* (2013.01); *H04B 7/0602* (2013.01); *H04L 1/1861* (2013.01); *H04W 72/04* (2013.01); *H04W 72/0413* (2013.01)

(58) Field of Classification Search
CPC ..... H04L 5/005; H04L 1/1861; H04L 5/0048; H04L 5/0053; H04L 5/0023; H04W 72/04; H04W 72/0413; H04B 7/0602
See application file for complete search history.

(56) References Cited

U.S. PATENT DOCUMENTS

| | | | | |
|---|---|---|---|---|
| 2014/0341145 | A1* | 11/2014 | Nakashima | H04W 72/042 370/329 |
| 2015/0049733 | A1* | 2/2015 | Chen | H04L 5/0053 370/330 |
| 2017/0171850 | A1* | 6/2017 | Ang | H04L 5/0055 |

FOREIGN PATENT DOCUMENTS

| | | |
|---|---|---|
| CN | 101431355 | 5/2009 |
| CN | 103312438 | 9/2013 |
| CN | 103327619 | 9/2013 |
| TW | 201445947 | 12/2014 |
| WO | 2015166865 | 11/2015 |

OTHER PUBLICATIONS

IPO, ISR for PCT/CN2016/100568, dated Jun. 19, 2017.
(Continued)

*Primary Examiner* — Jackie Zuniga Abad
(74) *Attorney, Agent, or Firm* — Hodgson Russ LLP

(57) ABSTRACT

Embodiments of the present invention provide a data transmission method, a channel estimation method, and a device. The data transmission method comprises: sending, by a first device, an uplink pilot signal to a second device through antenna ports in a first antenna port set; and sending, by the first device, preprocessed uplink control information on which a preprocess is performed to the second device through at least some antenna ports in the first antenna port set.

18 Claims, 7 Drawing Sheets

(56) References Cited

OTHER PUBLICATIONS

Intel Corporation, "Discussion on CSI feedback for NR," 3GPP TSG-RAN WG1 #86, R1-167129, Aug. 2016, 3 pages.
LG Electronics, "DMRS Design Issues in NR," 3GPP TSG RAN WG1 Meeting #86, R1-166907, Aug. 2016, 7 pages.
EPO, Office Action for EP Application No. 16917125.3, dated Jul. 15, 2019.
TIPO, Office Action for TW Application No. 106128854, dated Dec. 23, 2019.
CNIPA, Second Office Action for CN Application No. 201680086515.5, dated Dec. 27, 2019.
Ericsson et al., "WF on low-PAPR/CM technique," 3GPP TSG RAN WG1 Meeting #86, R1-168422, Aug. 2016, 3 pages.
"3rd Generation Partnership Project; Technical Specification Group Radio Access Network; Evolved Universal Terrestrial Radio Access (E-UTRA); Physical channels and modulation (Release 13)," 3GPP TS 36.211, Jun. 2016, v.13.2.0, 170 pages.
Spreadtrum et al., "Way forward on forward compatibility for waveform evolution," 3GPP TSG RAN WG1 Meeting #85bis, R1-165674, May 2016, 4 pages.
EPO, Office Action for EP Application No. 16917125.3, dated Aug. 14, 2020.
IPI, Office Action for IN Application No. 201817050038, dated Oct. 9, 2020.

\* cited by examiner

DATA TRANSMISSION METHOD, CHANNEL ESTIMATION METHOD, AND APPARATUS

CROSS REFERENCE

This application is a continuation of International Application No. PCT/CN2016/100568 filed Sep. 28, 2016, the entire disclosure of which is incorporated herein by reference.

TECHNICAL FIELD

The present disclosure relates to the field of wireless communication technologies, and particularly to a data transmission method, a channel estimation method, and device.

BACKGROUND

In a Long Term Evolution (LTE) system, uplink information sent by a terminal device to a network side device includes uplink control information, a Demodulation Reference Signal (DMRS), and a Sounding Reference Symbol (SRS). Before sending the uplink control information and the DMRS, the terminal device preprocesses the uplink control information and the DMRS, and then sends the preprocessed uplink control information and DMRS (the same frequency domain resource is used for sending the preprocessed uplink control information and DMRS) to the network side device. Then, the network side device performs demodulation of the uplink control information and sounding of an uplink channel according to the DMRS and the SRS, respectively.

SUMMARY

The present disclosure provides a data transmission method, a channel estimation method, and a device, to save signaling and resource overheads.

According to a first aspect, a data transmission method is provided. The method includes: sending, by a first device, an uplink pilot signal to a second device through antenna ports in a first antenna port set; and sending, by the first device, preprocessed uplink control information on which a preprocess is performed to the second device through at least some antenna ports in the first antenna port set.

According to a second aspect, a channel estimation method is provided. The method includes: receiving, by a second device, an uplink pilot signal that is sent by a first device through antenna ports in a first antenna port set; receiving, by the second device, preprocessed uplink control information that is sent by the first device through at least some antenna ports in the first antenna port set, wherein a preprocess is performed on the preprocessed uplink control information; performing, by the second device, channel estimation according to the uplink pilot signal, to obtain uplink channel information; and demodulating, by the second device, the preprocessed uplink control information according to the uplink channel information.

According to a third aspect, a data transmission device is provided. The data transmission device includes modules configured to perform the method according to the first aspect.

According to a fourth aspect, a channel estimation device is provided. The channel estimation device includes modules configured to perform the method according to the second aspect.

According to a fifth aspect, a data transmission device is provided, including a memory, a transceiver, and a processor.

The memory is configured to store a program. The processor is configured to execute the program, and when the program is executed, the processor is configured to invoke the transceiver to perform the method according to the first aspect.

According to a sixth aspect, a channel estimation device is provided, including a memory, a transceiver, and a processor. The memory stores a program. The processor is configured to execute the program, and when the program is executed, the processor invokes the transceiver to perform the method according to the second aspect.

According to a seventh aspect, a computer-readable medium is provided. The computer-readable medium stores program code executable by a device, where the program code includes instructions used for performing the method according to the first aspect.

According to an eighth aspect, a computer-readable medium is provided. The computer-readable medium stores program code executable by a device, where the program code includes instructions used for performing the method according to the second aspect.

BRIEF DESCRIPTION OF THE DRAWINGS

To make the technical solutions in the embodiments of the present disclosure more clear, the following briefly describes the accompanying drawings of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

The transmission of uplink information by terminal devices in related arts has the following shortcomings. The terminal devices need to transmit two pieces of information (namely, the DMRS and the SRS) to the network side device, so that the network device can perform demodulation of the uplink control signal and sounding of the uplink channel. Thus, a large quantity of resources are occupied when the terminal devices send the uplink information.

To address at least a part of the problems with the related arts, embodiments of the present disclosure provide data transmission method and devices, and channel estimation method and devices.

It should be understood that the technical solutions in the embodiments of the present disclosure can be applied to various communications systems, for example, Global System for Mobile communications (GSM) system, Code Division Multiple Access (CDMA) system, Wideband Code Division Multiple Access (WCDMA) system, General Packet Radio Service (GPRS) system, Long Term Evolution (LTE) system, Universal Mobile Telecommunication System (UMTS) and other existing communications systems, and particularly can be applied to a future fifth-generation mobile communications technology (5G) system.

A terminal device in the embodiments of the present disclosure may refer to user equipment (UE), an access terminal, a subscriber unit, a subscriber station, a mobile station, a mobile console, a remote station, a remote terminal, a mobile device, a user terminal, a terminal, a wireless communications device, a user agent, or a user device. The access terminal may be a cellular phone, a cordless phone, a Session Initiation Protocol (SIP) phone, a wireless local loop (WLL) station, a personal digital assistant (PDA), a handheld device having a wireless communication function, a computing device, other processing device connected to a wireless modem, an in-vehicle device, a wearable device, a terminal device in a future 5G network, a terminal device in a future evolved public land mobile network (PLMN), or the like. Embodiments of the present disclosure do not impose specific limitations on this.

A network side device in the embodiments of the present disclosure may be a device configured to communicate with the terminal device. The network side device may be a base transceiver station (BTS) in GSM or CDMA, a NodeB (NB) in a WCDMA system, an evolved base station (Evolutional NodeB, eNB or eNodeB) in an LTE system, or a radio controller in a cloud radio access network (CRAN) scenario; or the network side device may be a relay station, an access point, an in-vehicle device, a wearable device, a network side device in a future 5G network, a network side device in a future evolved PLMN network, or the like. Embodiments of the present disclosure do not impose specific limitations on this.

Figure 1:
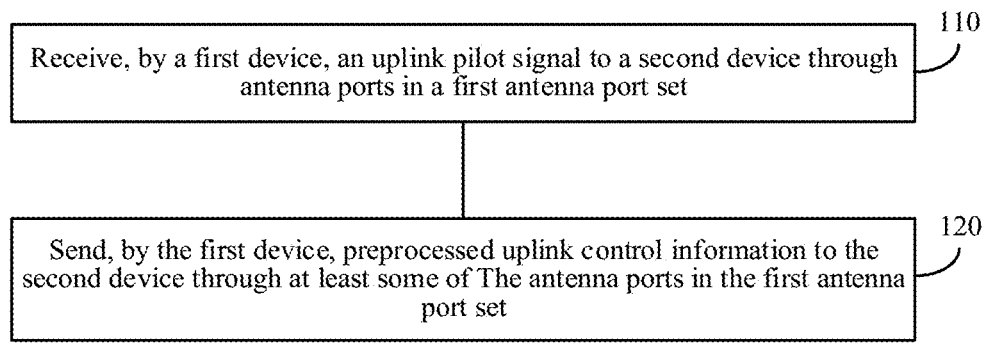
FIG. 1 is a schematic flowchart of a data transmission method according to an embodiment of the present disclosure.

FIG. 1 is a schematic flowchart of a data transmission method according to an embodiment of the present disclosure. The method in FIG. 1 includes the following steps.

In 110, a first device sends an uplink pilot signal to a second device through antenna ports in a first antenna port set.

It should be understood that the first device and the second device herein may be a terminal device and a network side device, respectively, or the first device and the second device may both be terminal devices (in this case, communications between the first device and the second device may be device-to-device communications).

In addition, it should be understood the sending of the uplink pilot signal by the first device to the second device through antenna ports in the first antenna port means that the first device sends the uplink pilot signal to the second device through all antenna ports in the first antenna port set. In other words, the antenna ports used by the first device to send the uplink pilot signal constitute the first antenna port set. For example, if the first antenna port set is $\{0,1,2,3\}$, the first device sends the uplink pilot signal to the second device through the four antenna ports in the first antenna port set $\{0,1,2,3\}$; if the first device sends the uplink pilot signal to the second device through two antenna ports $\{0,1\}$, the first antenna port set is $\{0,1\}$.

Optionally, the uplink pilot signal is an uplink pilot signal on which the first device does not perform the preprocess which is performed on the uplink control information. Because the preprocess on the uplink control information is not performed on the uplink pilot signal, the second device can perform uplink channel estimation according to the uplink pilot signal to obtain un-preprocessed uplink channel information after receiving the uplink pilot signal. The uplink channel information herein may be channel information between the first device and the second device.

In 120, the first device sends preprocessed uplink control information to the second device through at least some antenna ports in the first antenna port set.

It should be understood that if a set consisting of the antenna ports used by the first device to send the preprocessed uplink control information is a second antenna port set, the second antenna port set is a subset of the first antenna port set. For example, if the first device sends the uplink pilot signal to the second device through four antenna ports, the first device may send the preprocessed uplink control information to the second device through any one or more of the four antenna ports. That is to say, the number of antenna ports used for transmitting the preprocessed uplink control information is smaller than or equal to the number of antenna ports used for transmitting the uplink pilot signal. For example, when the first antenna port set is $\{0,1,2,3\}$, the second antenna port set may be $\{0\}$, $\{0,1\}$ or $\{0,1,2,3\}$.

Optionally, the preprocessed uplink control information and the uplink pilot signal are sent by the first device through the same antenna ports.

That is to say, the antenna ports used for transmitting the preprocessed uplink control information are the same as the antenna ports used for transmitting the uplink pilot signal, and the first antenna port set and the second antenna port set are the same set.

For example, if the first device has two uplink antenna ports $\{0,1\}$, the first device transmits the uplink pilot signal and the preprocessed uplink control information through the antenna ports $\{0,1\}$; if the first device has four uplink antenna ports $\{0,1,2,3\}$, the first device can transmit the uplink pilot signal and the preprocessed uplink control information through the antenna ports $\{0,1,2,3\}$. Because the uplink pilot signal and the preprocessed uplink control information are transmitted through the same antenna ports, the second device can demodulate the uplink control information according to the uplink pilot signal after receiving the uplink pilot signal.

In this embodiment of the present disclosure, the preprocessed uplink control information is transmitted through some or all of the antenna ports used for transmitting the uplink pilot signal, so that the second device can perform channel estimation on an uplink channel and demodulation of the uplink control information according to the uplink pilot signal. That is to say, the measurement of the uplink channel information and the demodulation of the uplink control information by the second device are implemented by using one uplink pilot signal. Therefore, signaling and resource overheads are reduced.

Specifically, in the prior art, to implement the demodulation of uplink control information and the measurement of uplink channel information, a first device needs to send two signals to a second device, namely, a DMRS and an SRS; then the second device demodulates the uplink control information according to the DMRS, and performs channel estimation on an uplink channel according to the SRS. Such a signal transmission manner leads to a series of problems. For example, in a future 5G system, to reduce the information transmission delay between the first device and the second device, a frame structure is designed in such a manner that the transmission of downlink data, the transmission of the uplink control information, and the SRS, which originally can be completed within a plurality of subframes or timeslots, can completed within one subframe or timeslot. In this case, the downlink data, the uplink control channel and the SRS are generally time division multiplexed (TDM). That is to say, the downlink data, the uplink control channel and the SRS can occupy different Orthogonal Frequency Division Multiplexing (OFDM) symbols, and the uplink control channel generally occupies a small number of OFDM symbols. In this case, if a DMRS is separately designed for the uplink control channel, extra resource overheads are required. Therefore, in this embodiment of the present disclosure, a uplink pilot signal which can achieve functions of two types of information, namely, the DMRS and the SRS in the prior art is sent, and thus the embodiment can reduce signaling overheads and reduce the occupation of physical resources.

Optionally, in an embodiment, a transmission bandwidth of the uplink pilot signal includes a transmission bandwidth of the preprocessed uplink control information.

That is to say, a bandwidth of the frequency domain resource allocated to the uplink control information is smaller than or equal to a bandwidth of the frequency domain resource allocated to the preprocessed uplink control information, and the frequency domain resource allocated to the uplink control information falls within the range of the frequency domain resource allocated to the preprocessed uplink control information. For example, physical resource blocks (PRBs) occupied by the uplink control information are PRB 0 to PRB 5, and PRBs occupied by the uplink pilot signal are PRB 0 to PRB 11. That is to say, the physical resource blocks occupied by the uplink control information are a part of the physical resource blocks occupied by the uplink pilot signal.

When the uplink control information is demodulated according to the uplink pilot signal, the closer the frequency domain resource occupied by the uplink pilot signal is to the frequency domain resource occupied by the preprocessed uplink control information, the better the effect of demodulation of the preprocessed uplink control information according to the uplink pilot signal will be. If there is a great difference between the frequency domain resource occupied by the uplink pilot signal and the frequency domain resource occupied by the preprocessed uplink control information, the demodulation of the uplink control information may need to be implemented by using a differential algorithm, and the demodulation of the uplink control information cannot be implemented conveniently. Therefore, when the frequency domain resource occupied by the uplink pilot signal includes the frequency domain resource occupied by the uplink control information, the demodulation of the uplink control information can be better implemented.

Figure 2:
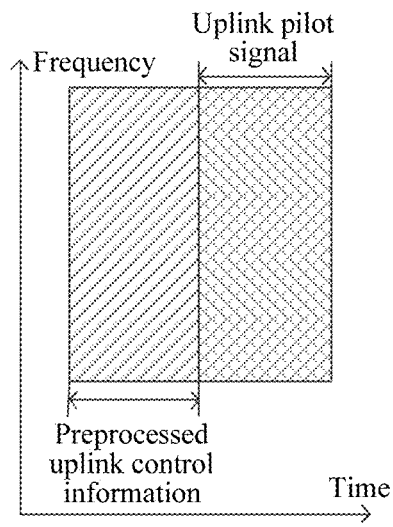
FIG. 2 is a schematic diagram of a transmission bandwidth of uplink control information and a transmission bandwidth of an uplink pilot signal.

As shown in FIG. 2, the transmission bandwidth of the uplink pilot signal is the same as the transmission bandwidth of the preprocessed uplink control information. That is to say, the bandwidth of the frequency domain resource occupied by the uplink pilot signal is exactly the same as the bandwidth of the frequency domain resource occupied by the uplink control information, the uplink pilot signal and the preprocessed uplink control information are sent on the same frequency domain resource(s), and the second device can better demodulate the preprocessed uplink control information according to the uplink pilot signal.

Figure 3:
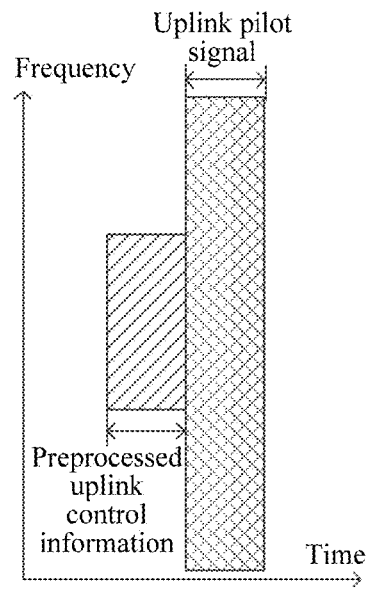
FIG. 3 is a schematic diagram of a transmission bandwidth of uplink control information and a transmission bandwidth of an uplink pilot signal.

In addition, as shown in FIG. 3, the transmission bandwidth of the uplink pilot signal is greater than the transmission bandwidth of the preprocessed uplink control information. In this way, the second device can demodulate the preprocessed uplink control information according to the uplink pilot signal transmitted on the same bandwidth. In addition, because the transmission bandwidth occupied by the uplink pilot signal is large, the second device can better measure the uplink channel information according to the uplink pilot signal.

Optionally, in an embodiment, a resource density of a frequency domain resource used for transmitting the uplink pilot signal is smaller than a resource density of a frequency domain resource used for transmitting the preprocessed uplink control information.

There is generally a low requirement on the measurement accuracy of the uplink channel information. To improve the utilization efficiency of the frequency domain resource, the frequency domain resource used for transmitting the uplink pilot signal may be discrete in the frequency domain. In this way, a small amount of the frequency domain resource(s) is occupied when the uplink pilot signal is sent, and the remaining frequency domain resource(s) can be used by another device to send uplink information, thereby improving the utilization of the frequency domain resource.

Figure 4:
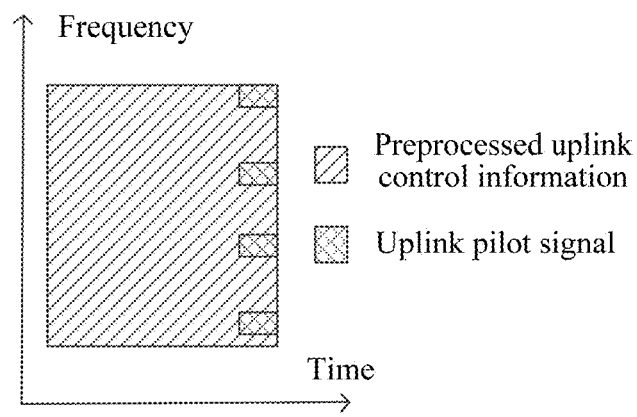
FIG. 4 is a schematic diagram of a frequency domain resource used for transmitting uplink control information and a frequency domain resource used for transmitting an uplink pilot signal.

As shown in FIG. 4, the transmission bandwidth of the uplink pilot signal is substantially the same as the transmission bandwidth of the preprocessed uplink control information, the frequency domain resource(s) occupied by the uplink pilot signal is(are) discrete, the frequency domain resource(s) occupied by the uplink control information is(are) continuous, and a resource density of the frequency domain resource(s) occupied by the uplink pilot signal is smaller than a resource density of the frequency domain resource(s) occupied by the preprocessed uplink control information.

Figure 5:
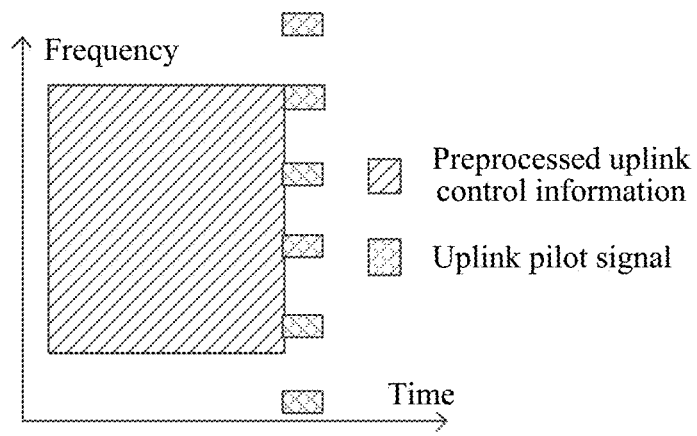
FIG. 5 is a schematic diagram of a frequency domain resource used for transmitting uplink control information and a frequency domain resource used for transmitting an uplink pilot signal.

As shown in FIG. 5, the transmission bandwidth of the uplink pilot signal is greater than the transmission bandwidth of the preprocessed uplink control information, the bandwidth of the frequency domain resource(s) occupied by the uplink pilot signal is greater than the bandwidth of the frequency domain resource(s) occupied by the uplink control information, the frequency domain resource(s) occupied by the uplink pilot signal is(are) discrete, the frequency domain resource(s) occupied by the uplink control information is(are) continuous, and a resource density of the frequency domain resource(s) occupied by the uplink pilot signal is(are) also smaller than a resource density of the frequency domain resource(s) occupied by the uplink control information.

In FIG. 4 and FIG. 5, the frequency domain resource(s) of the uplink pilot signal is(are) discretely distributed, and some frequency domain resources within the range of the transmission bandwidth of the uplink pilot signal are not utilized, and these frequency domain resources that are not used for transmitting the uplink pilot signal may be used to transmit uplink pilot signals or other information of other devices. Therefore, the utilization of resources is improved.

Specifically, when the density of the frequency domain resource(s) of the uplink pilot signal is smaller than the density of the frequency domain resource(s) of the preprocessed uplink control information, a frequency domain resource gap (that is, Comb value) of the uplink pilot signal is N resource elements (REs), where N is 2, 4 or 8, and a frequency domain resource gap of the uplink control information is one RE. That is to say, the uplink control information occupies all frequency domain resources in the transmission bandwidth.

It should be understood that FIG. 2 and FIG. 3 merely show a relationship between the transmission bandwidth of the uplink pilot signal and the transmission bandwidth of the preprocessed uplink control information. Actually, the frequency domain resource(s) occupied by the uplink pilot signal in FIG. 2 and FIG. 3 may be continuous or discrete (similar to FIG. 4 and FIG. 5).

Optionally, in an embodiment, a time domain resource used for transmitting the uplink pilot signal is adjacent to a time domain resource used for transmitting the preprocessed uplink control information.

During the allocation of time domain resources for the uplink pilot signal and the preprocessed uplink control information, adjacent time domain resources may be allocated to the two types of information. In this way, the transmission time of the uplink pilot signal is close to that of the preprocessed uplink control information, and the preprocessed uplink control information can be better demodulated according to the uplink pilot signal. If during the allocation of time domain resources, time domain resources allocated to the uplink pilot signal and the preprocessed uplink control information are distant from each other, the effect of demodulation of the preprocessed uplink control information according to the uplink pilot signal may be poor. The reason is that if the transmission time of the uplink control information is distant from the transmission time of the uplink pilot signal, the channel may change, and consequently the demodulation of the uplink control information according to the uplink pilot signal becomes inaccurate.

Figure 6:
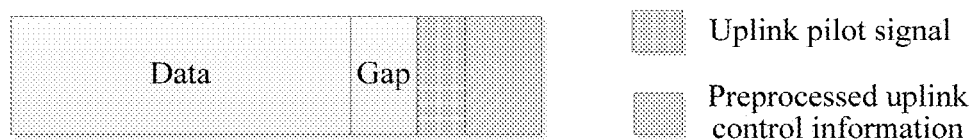
FIG. 6 is a schematic diagram of a time domain resource used for transmitting uplink control information and a time domain resource used for transmitting an uplink pilot signal.
Figure 7:
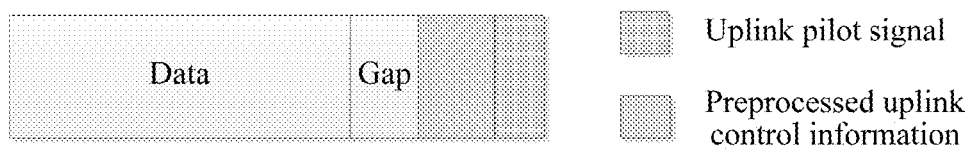
FIG. 7 is a schematic diagram of a time domain resource used for transmitting uplink control information and a time domain resource used for transmitting an uplink pilot signal.

Specifically, as shown in FIG. 6 and FIG. 7, the time domain resource of the uplink pilot signal is adjacent to the time domain resource of the preprocessed uplink control information. In FIG. 6, the time domain resource of the uplink pilot signal is prior to that of the preprocessed uplink control information, and the first device first transmits the uplink pilot signal and then transmits the preprocessed uplink control information. In FIG. 7, the time domain resource of the preprocessed uplink control information is prior to that of the uplink pilot signal, and the first device first transmits the preprocessed uplink control information and then transmits the uplink pilot signal.

Optionally, in an embodiment, a time domain resource used for transmitting the preprocessed uplink control information includes a time domain resource used for transmitting the uplink pilot signal.

Specifically, the time domain resource allocated to the preprocessed uplink control information may not be all used to send the preprocessed uplink control information, and a part of the time domain resource(s) originally allocated to the uplink control information is(are) reserved and allocated to the uplink pilot signal (the uplink pilot signal generally needs to occupy a small amount of the time domain resource(s), and does not affect the transmission of the preprocessed uplink control information). In this way, a certain amount of time domain resource(s) can be saved. In addition, because the time domain resource(s) of the preprocessed uplink control information includes(include) the time domain resource(s) used for transmitting the uplink pilot signal, the preprocessed uplink control information can be better demodulated according to the uplink pilot signal. The reason is that because the transmission time of the uplink pilot signal is close to that of the preprocessed uplink control information, the channel changes slightly, and therefore the demodulation of the uplink control information and the channel estimation on an uplink channel according to the uplink pilot signal are both accurate.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

It should be understood that N may be an integer such as 1 or 2, and N may be a preset value or may be a value preconfigured by the second device. In addition, the time domain resource unit herein may be an OFDM symbol, a timeslot or other time domain resource units defined in 5G. The M time domain resource units may alternatively be time domain resource units in the middle of the N time domain units.

Figure 8:
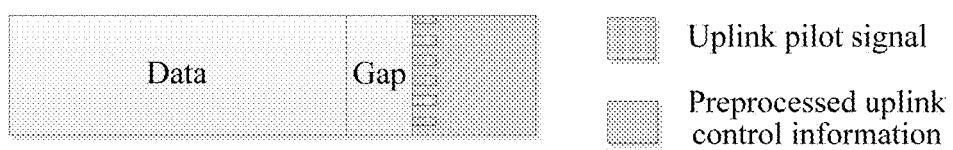
FIG. 8 is a schematic diagram of a time domain resource used for transmitting uplink control information and a time domain resource used for transmitting an uplink pilot signal.
Figure 9:
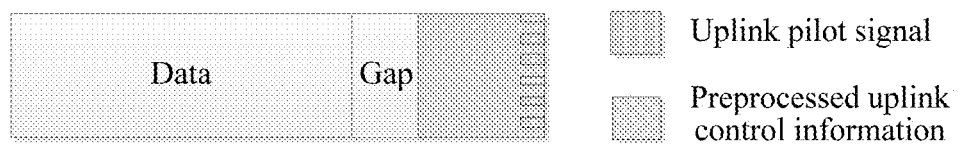
FIG. 9 is a schematic diagram of a time domain resource used for transmitting uplink control information and a time domain resource used for transmitting an uplink pilot signal.

Specifically, as shown in FIG. 8, the time domain resource(s) of the preprocessed uplink control information includes(include) the time domain resource(s) of the uplink pilot signal, and the time domain resource(s) of the uplink pilot signal is(are) located in the front part of the time domain resource(s) of the preprocessed uplink control information. As shown in FIG. 9, the time domain resource(s) of the preprocessed uplink control information includes(include) the time domain resource(s) of the uplink pilot signal, and the time domain resource(s) of the uplink pilot signal is(are) located in the rear part of the time domain resource(s) of the preprocessed uplink control information.

It should be understood that when the time domain resource(s) of the preprocessed uplink control information includes(include) the time domain resource(s) of the uplink pilot signal, the time domain resource(s) of the uplink pilot signal may be located in the front or rear part of the time domain resource(s) of the preprocessed uplink control information, or may be located at other positions (for example, in the middle) of the time domain resource of the preprocessed uplink control information.

Optionally, in an embodiment, the first device receives Downlink Control Information DCI sent by the second device. The DCI is used for triggering the first device to send the preprocessed uplink control information and the uplink pilot signal to the second device. That is to say, the DCI triggers the first device to send the preprocessed uplink control information and the uplink pilot signal to the second device. The two types of information correspond to the same DCI. Therefore, the second device can perform channel estimation for the preprocessed uplink control information according to the uplink pilot signal, and demodulate the preprocessed uplink control information according to channel information obtained through the channel estimation.

Optionally, in an embodiment, the method according to this embodiment of the present disclosure further includes: performing, by the first device, the preprocess on the uplink control information. The preprocess includes at least one of Discrete Fourier Transform DFT, pre-coding, transmit diversity processing, filtering, and windowing. Generally speaking, the preprocess which is performed by the first device on the uplink control information is known to both the first device and the second device. The first device and the second device may determine in advance the preprocess which is performed on the uplink control information. Alternatively, the second device determines the preprocess performed on the uplink control information, and then sends indication information to the first device to inform the first device of the preprocess to be performed on the uplink control information. When performing preprocess on the uplink control information, the first device performs preprocess on the uplink control information by using the preprocess as indicated by the indication information.

Specifically, the first device may determine a pre-coding manner for the uplink control information according to a pre-coding matrix indicated by the second device, or the first device may pre-code the uplink control information according to a pre-coding matrix which the first and second device agree on in advance. The first device may also perform transmit diversity processing on the uplink control information according to a predefined transmit diversity manner. The transmit diversity processing manner may be Spatial Frequency Block Coding (SFBC), Space Time Block Coding (STBC), Spatial Orthogonal Resource Transmit Diversity (SORTD) coding, precoder cycling, and the like.

Optionally, in an embodiment, the uplink pilot signal carries ACK/NACK information of the first device. In this way, the second device can directly obtain the ACK/NACK information of the first device according to the uplink pilot signal.

The uplink pilot signal is used to carry the ACK/NACK information which is originally carried by the uplink control information, so that the first device can not only send the ACK/NACK information by using the uplink control information, but also can send the ACK/NACK information by using the uplink pilot signal. Therefore, the flexibility of the first device in sending the two types of feedback information is improved. In addition, the number of bits in the uplink control information can be reduced, thereby improving the performance in demodulation of the uplink control information.

In addition, when the uplink pilot signal carries the ACK/NACK information, different weights of a pilot sequence included in the uplink pilot signal may be used to represent the ACK/NACK information. For example, when the ACK/NACK information is ACK information or NACK information, weight of the pilot sequence is 1 or −1, and the ACK/NACK information can be carried by directly multiplying the weight of the pilot sequence by the uplink pilot signal or the pilot sequence included in the uplink pilot signal. In this way, after receiving the uplink pilot signal, the second device can obtain the corresponding ACK/NACK information by parsing (or analyzing) the weight in the uplink pilot signal. Because the ACK/NACK information can be represented by using the pilot sequence, resource overheads can be saved to a certain extent.

Optionally, in an embodiment, a scrambling sequence and/or a control information format of the uplink control information is obtained based on a sequence ID carried by the uplink pilot signal. Before generating the uplink control information, the first device may determine a scrambling sequence of the uplink control information and a control information format of the uplink control information according to a sequence ID carried by the uplink pilot signal. That is to say, the uplink control information and the uplink pilot signal generated by the first device are closely related. Therefore, after receiving the uplink pilot signal, the second device can also demodulate the uplink control information according to the uplink pilot signal.

The data transmission methods according to the embodiments of the present disclosure are described above from the perspective of the first device with reference to FIG. 1 to FIG. 9. Channel estimation methods according to embodiments of the present disclosure will be described below from the perspective of the second device with reference to FIG. 10. It should be understood that after the first device transmits the uplink pilot signal and the preprocessed uplink control information to the second device, the second device can perform channel estimation and demodulate the uplink control information according to the uplink pilot signal. Steps in the channel estimation methods according to the embodiments of the present disclosure correspond to the steps in the data transmission methods according to the embodiments of the present disclosure. For conciseness in description, when the channel estimation methods according to the embodiments of the present disclosure are described, some contents that have been described above with respect to the data transmission methods according to the embodiments of the present disclosure will be omitted herein.

Figure 10:
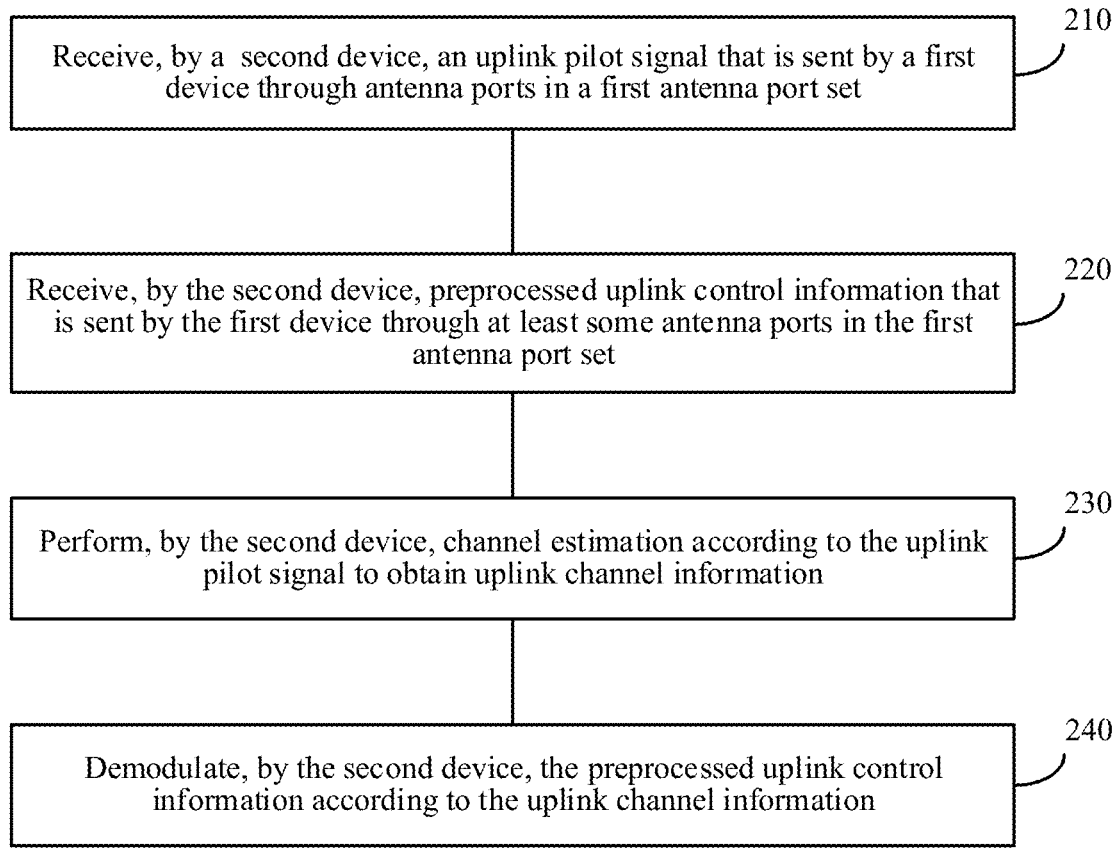
FIG. 10 is a schematic flowchart of a channel estimation method according to an embodiment of the present disclosure.

FIG. 10 is a schematic flowchart of a channel estimation method according to an embodiment of the present disclosure. The method in FIG. 10 includes the following steps.

In 210, a second device receives an uplink pilot signal that is sent by a first device through antenna ports in a first antenna port set.

Optionally, the uplink pilot signal is a signal on which the preprocess is not performed. That is to say, the preprocess performed on the uplink control information is not performed on the uplink pilot signal. Therefore, the second device can demodulate the uplink control information according to the uplink pilot signal.

The first device and the second device may be respectively a network side device and a terminal device. Alternatively, both the first device and the second device are terminal devices.

In 220, the second device receives preprocessed uplink control information that is sent by the first device through at least some antenna ports in the first antenna port set.

Optionally, the preprocessed uplink control information and the uplink pilot signal are received by the second device through the same antenna ports.

In 230, the second device performs channel estimation according to the uplink pilot signal to obtain uplink channel information.

In 240, the second device demodulates the preprocessed uplink control information according to the uplink channel information.

Optionally, the demodulating, by the second device, the preprocessed uplink control information according to the uplink channel information specifically includes:

determining, by the second device, the preprocess which is performed by the first device preprocesses the uplink control information, where the preprocess includes at least one of pre-coding, transmit diversity processing, filtering, and windowing; and demodulating, by the second device, the preprocessed uplink control information sent by the first device according to the uplink channel information and the preprocess which is performed by the first device on the uplink control information.

The transmit diversity processing may include: SFBC, STBC, SORTD, precoder cycling, and the like.

In this embodiment of the present disclosure, the preprocessed uplink control information is transmitted through some or all of the antenna ports used for transmitting the uplink pilot signal, so that the second device can perform channel estimation on an uplink channel and demodulation of the uplink control information according to the uplink pilot signal. That is to say, the measurement of the uplink channel information and the demodulation of the uplink control information by the second device are implemented by using one uplink pilot signal. Therefore, signaling and resource overheads are reduced.

Optionally, in an embodiment, a transmission bandwidth of the uplink pilot signal includes a transmission bandwidth of the preprocessed uplink control information.

In this embodiment of the present disclosure, because the bandwidth of the frequency domain resource(s) of the uplink control information is smaller than or equal to the bandwidth of the frequency domain resource(s) allocated to the preprocessed uplink control information, the second device can better demodulate the preprocessed uplink control information according to the uplink pilot signal. To be specific, the closer the frequency domain resource occupied by the uplink pilot signal is to the frequency domain resource occupied by the preprocessed uplink control information, the better the effect of demodulation of the preprocessed uplink control information according to the uplink pilot signal will be. If there is a great difference between the frequency domain resource occupied by the uplink pilot signal and the frequency domain resource occupied by the preprocessed uplink control information, the demodulation of the preprocessed uplink control information may need to be implemented according to the uplink pilot signal by using a differential algorithm.

Optionally, in an embodiment, a resource density of a frequency domain resource used for transmitting the uplink pilot signal is smaller than a resource density of a frequency domain resource used for transmitting the preprocessed uplink control information.

Because there is a low requirement on the measurement accuracy of the uplink channel information, the frequency domain resource used for transmitting the uplink pilot signal may be discrete in the frequency domain. To improve the utilization of the frequency domain resource, a small amount of the frequency domain resource(s) may be occupied when the uplink pilot signal is sent, without affecting the demodulation of the uplink control information according to the uplink pilot signal by the second device after receiving the uplink pilot signal.

Optionally, in an embodiment, a time domain resource used for transmitting the uplink pilot signal is adjacent to a time domain resource used for transmitting the preprocessed uplink control information.

When the transmission time of the uplink pilot signal is adjacent to that of the preprocessed uplink control information, the second device can more accurately demodulate the uplink control information according to the uplink pilot signal. The reason is that if the transmission time of the uplink pilot signal is distant from the transmission time of the uplink control information, the channel may change to some extent, and consequently the demodulation of the uplink control information according to the uplink pilot signal becomes inaccurate.

Optionally, in an embodiment, a time domain resource used for transmitting the preprocessed uplink control information includes a time domain resource used for transmitting the uplink pilot signal.

Because the uplink pilot signal occupies a small amount of time domain resource(s), the uplink pilot signal can be directly transmitted within the time domain resource(s) which is(are) originally allocated to the uplink control information. In this way, the second device can more accurately demodulate the preprocessed uplink control information according to the uplink pilot signal. In addition, a certain amount of time domain resource(s) can be saved.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

Preferably, N may be an integer such as 1 or 2, and N may be a preset value or may be a value preconfigured by the second device. In addition, the time domain resource unit mentioned herein may be an OFDM symbol, a timeslot or other time domain resource units defined in 5G. It should also be understood that the M time domain resource units may alternatively be time domain resource units in the middle of the N time domain units.

Optionally, in an embodiment, the method according to this embodiment of the present disclosure may further include: sending, by the second device, Downlink Control Information DCI to the first device, where the DCI is used for triggering the first device to send the preprocessed uplink control information and the uplink pilot signal to the second device.

That is to say, the uplink pilot signal and the preprocessed uplink control information received by the second device are for the same DCI. In this way, the uplink control information can be accurately demodulated according to the uplink pilot signal. If the uplink pilot signal and the preprocessed uplink control information received by the second device are not for the same DCI, the second device cannot accurately demodulate the preprocessed uplink control information according to the uplink pilot signal.

Optionally, in an embodiment, the second device obtains ACK/NACK information of the first device from the uplink pilot signal. Specifically, the first device may add the ACK/NACK information to the uplink pilot signal, and transmit the ACK/NACK information of the first device by using the uplink pilot signal. In this way, after receiving the uplink pilot signal, the second device can obtain the ACK/NACK information of the first device by parsing the uplink pilot signal.

By carrying the ACK/NACK information by the uplink pilot signal, the flexibility of transmission of the ACK/NACK information can be improved, and the number of bits in the uplink control information can be reduced, thereby improving the performance of demodulation in the uplink control information.

Optionally, in an embodiment, a scrambling sequence and/or a control information format of the uplink control information is obtained based on a sequence ID carried by the uplink pilot signal. That is to say, when generating the uplink control information, the first device considers some information of the uplink pilot signal. Thus, a relationship is established between the uplink pilot signal and the uplink control information, so that when demodulating the preprocessed uplink control information according to the uplink pilot signal, the second device can demodulate the preprocessed uplink control information according to the relationship that is established between the uplink pilot signal and the uplink control information by the first device.

The data transmission methods and the channel estimation methods according to the embodiments of the present disclosure are described above with reference to FIG. 1 to FIG. 10. Data transmission devices and channel estimation devices according to the embodiments of the present disclosure will be described below with reference to FIG. 11 to FIG. 14. It should be understood that the data transmission devices and the channel estimation devices in FIG. 11 to FIG. 14 can perform relevant steps in the data transmission methods and the channel estimation methods that are described with respect to FIG. 1 to FIG. 10. To avoid repetition, details will not be described again.

Figure 11:
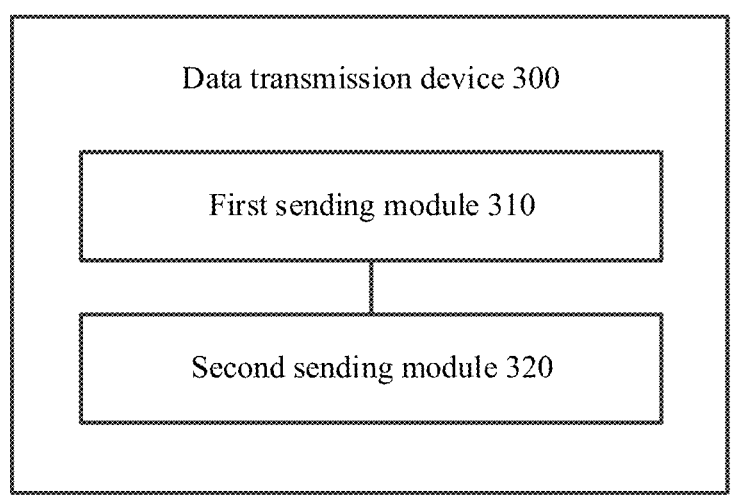
FIG. 11 is a schematic block diagram of a data transmission device according to an embodiment of the present disclosure.

FIG. 11 is a schematic block diagram of a data transmission device according to an embodiment of the present disclosure. The data transmission device 300 in FIG. 11 includes a first sending module 310 and a second sending module 320.

The first sending module 310 is configured to send an uplink pilot signal to another device through antenna ports in a first antenna port set.

The second sending module 320 is configured to send preprocessed uplink control information on which a preprocess is performed to the another device through at least some antenna ports in the first antenna port set.

The data transmission device 300 here is equivalent to the first device as described above.

In this embodiment of the present disclosure, the preprocessed uplink control information is transmitted through some or all of the antenna ports used for transmitting the uplink pilot signal, so that the another device can perform channel estimation on an uplink channel and demodulation of the uplink control information according to the uplink pilot signal. That is to say, the measurement of the uplink channel information and the demodulation of the uplink control information by the another device are implemented by using one uplink pilot signal. Therefore, signaling and resource overheads are reduced.

Optionally, in an embodiment, the uplink pilot signal is a signal on which the preprocessing is not performed.

Optionally, in an embodiment, a transmission bandwidth of the uplink pilot signal includes a transmission bandwidth of the preprocessed uplink control information.

Optionally, in an embodiment, a resource density of a frequency domain resource used for transmitting the uplink pilot signal is smaller than a resource density of a frequency domain resource used for transmitting the preprocessed uplink control information.

Optionally, in an embodiment, a time domain resource used for transmitting the uplink pilot signal is adjacent to a time domain resource used for transmitting the preprocessed uplink control information.

Optionally, in an embodiment, a time domain resource used for transmitting the preprocessed uplink control information includes a time domain resource used for transmitting the uplink pilot signal.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

Optionally, in an embodiment, the device further includes a receiving module 330 configured to receive downlink control information DCI sent by the another device. The DCI is used for triggering the device to send the preprocessed uplink control information and the uplink pilot signal to the another device.

Optionally, in an embodiment, the device further includes a preprocessing module 340 configured to perform the preprocess on the uplink control information. The preprocess includes at least one of Discrete Fourier Transform DFT, pre-coding, transmit diversity processing, filtering, and windowing.

Optionally, in an embodiment, the uplink pilot signal carries ACK/NACK information of the data transmission device 300.

Optionally, in an embodiment, the preprocessed uplink control information and the uplink pilot signal are sent by the device through the same antenna ports.

Optionally, in an embodiment, a scrambling sequence and/or a control information format of the uplink control information is obtained from a sequence ID carried by the uplink pilot signal.

Figure 12:
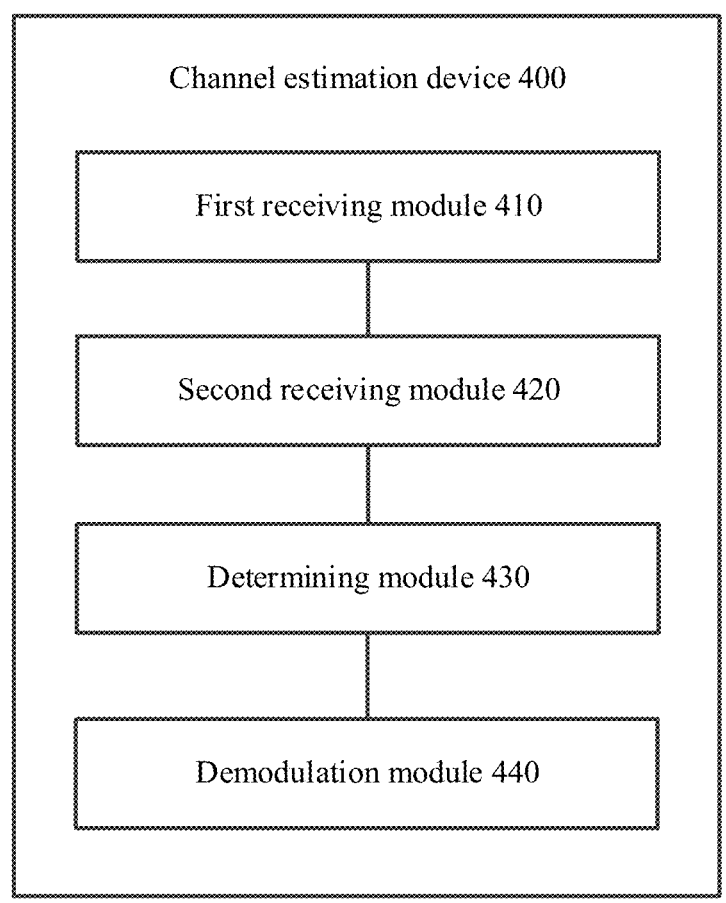
FIG. 12 is a schematic block diagram of a channel estimation device according to an embodiment of the present disclosure.

FIG. 12 is a schematic block diagram of a channel estimation device according to an embodiment of the present disclosure. The channel estimation device 400 in FIG. 12 includes a first receiving module 410, a second receiving module 420, a determining module 430 and a demodulation module 440.

The first receiving module 410 is configured to receive an uplink pilot signal that is sent by another device through antenna ports in a first antenna port set.

The second receiving module 420 is configured to receive preprocessed uplink control information that is sent by the another device through at least some antenna ports in the first antenna port set.

The determining module 430 is configured to perform channel estimation according to the uplink pilot signal, to determine uplink channel information.

The demodulation module 440 is configured to demodulate the preprocessed uplink control information according to the uplink channel information.

The channel estimation device 400 is equivalent to the second device as described above.

In this embodiment of the present disclosure, the preprocessed uplink control information is transmitted through some or all of the antenna ports used for transmitting the uplink pilot signal, so that the channel estimation device can perform channel estimation on an uplink channel and demodulation of the uplink control information according to the uplink pilot signal. That is to say, the measurement of the uplink channel information and the demodulation of the uplink control information by the channel estimation device are implemented by using one uplink pilot signal. Therefore, signaling and resource overheads are reduced.

Optionally, in an embodiment, the uplink pilot signal is a signal on which the preprocess is not performed.

Optionally, in an embodiment, the determining module 430 is further configured to: determine the preprocess which is performed by the another device on the uplink control information. The preprocess includes at least one of precoding, transmit diversity processing, filtering, and windowing.

The demodulation module 440 is configured to: demodulate the preprocessed uplink control information sent by the first device according to the uplink channel information and the preprocess which is performed by the another device on the uplink control information.

Optionally, in an embodiment, a transmission bandwidth of the uplink pilot signal includes a transmission bandwidth of the preprocessed uplink control information.

Optionally, in an embodiment, a resource density of a frequency domain resource used for transmitting the uplink pilot signal is smaller than a resource density of a frequency domain resource used for transmitting the preprocessed uplink control information.

Optionally, in an embodiment, a time domain resource used for transmitting the uplink pilot signal is adjacent to a time domain resource used for transmitting the preprocessed uplink control information.

Optionally, in an embodiment, a time domain resource used for transmitting the preprocessed uplink control information includes a time domain resource used for transmitting the uplink pilot signal.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

Optionally, in an embodiment, the device further includes a sending module 450 configured to send Downlink Control Information DCI to the first device. The DCI is used for triggering the another device to send the preprocessed uplink control information and the uplink pilot signal to the device.

Optionally, in an embodiment, the device further includes an obtaining module 460 configured to obtain ACK/NACK information of the first device from the uplink pilot signal.

Optionally, in an embodiment, the preprocessed uplink control information and the uplink pilot signal are received by the another device through the same antenna ports.

Optionally, in an embodiment, a scrambling sequence and/or a control information format of the uplink control information is obtained based on a sequence ID carried by the uplink pilot signal.

Figure 13:
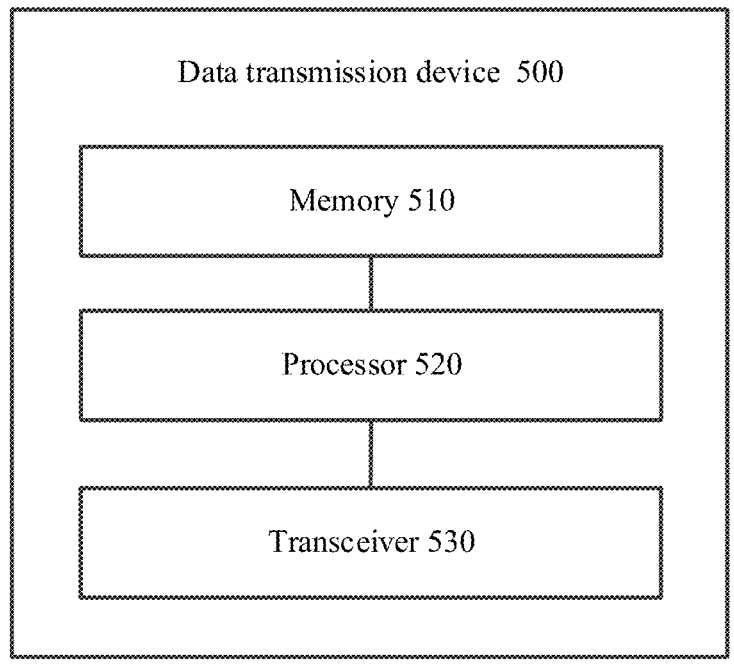
FIG. 13 is a schematic block diagram of a data transmission device according to an embodiment of the present disclosure.

FIG. 13 is a schematic block diagram of a data transmission device according to an embodiment of the present disclosure. The data transmission device 500 in FIG. 13 includes a memory 510, a processor 520 and transceiver 530.

The memory 510 is configured to store a program.

The processor 520 is configured to execute the program stored in the memory 510.

When the processor 520 executes the program stored in the memory 510, the processor 520 invokes the transceiver 530 to send an uplink pilot signal to another device through antenna ports in a first antenna port set. The processor 520 further invokes the transceiver 530 to send preprocessed uplink control information to the another device through at least some antenna ports in the first antenna port set.

The data transmission device 500 is equivalent to the first device as described above.

In this embodiment of the present disclosure, the preprocessed uplink control information is transmitted through some or all of the antenna ports used for transmitting the uplink pilot signal, so that the another device can perform channel estimation on an uplink channel and demodulation of the uplink control information according to the uplink pilot signal. That is to say, the measurement of the uplink channel information and the demodulation of the uplink control information by the another device are implemented by using one uplink pilot signal. Therefore, signaling and resource overheads are reduced.

Optionally, in an embodiment, the uplink pilot signal is a signal on which the preprocess is not performed.

Optionally, in an embodiment, a transmission bandwidth of the uplink pilot signal includes a transmission bandwidth of the preprocessed uplink control information.

Optionally, in an embodiment, a resource density of a frequency domain resource used for transmitting the uplink pilot signal is smaller than a resource density of a frequency domain resource used for transmitting the preprocessed uplink control information.

Optionally, in an embodiment, a time domain resource used for transmitting the uplink pilot signal is adjacent to a time domain resource used for transmitting the preprocessed uplink control information.

Optionally, in an embodiment, a time domain resource used for transmitting the preprocessed uplink control information includes a time domain resource used for transmitting the uplink pilot signal.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

Optionally, in an embodiment, the transceiver 530 is further configured to receive downlink control information DCI sent by the another device, where the DCI is used for triggering the device to send the preprocessed uplink control information and the uplink pilot signal to the another device.

Optionally, in an embodiment, the processor 520 is configured to perform the preprocess on the uplink control information. The preprocess includes at least one of Discrete Fourier Transform DFT, pre-coding, transmit diversity processing, filtering, and windowing.

Optionally, in an embodiment, the uplink pilot signal carries ACK/NACK information of the data transmission device 500.

Optionally, in an embodiment, the preprocessed uplink control information and the uplink pilot signal are sent by the device through the same antenna ports.

Optionally, in an embodiment, a scrambling sequence and/or a control information format of the uplink control information is obtained based on a sequence ID carried by the uplink pilot signal.

Figure 14:
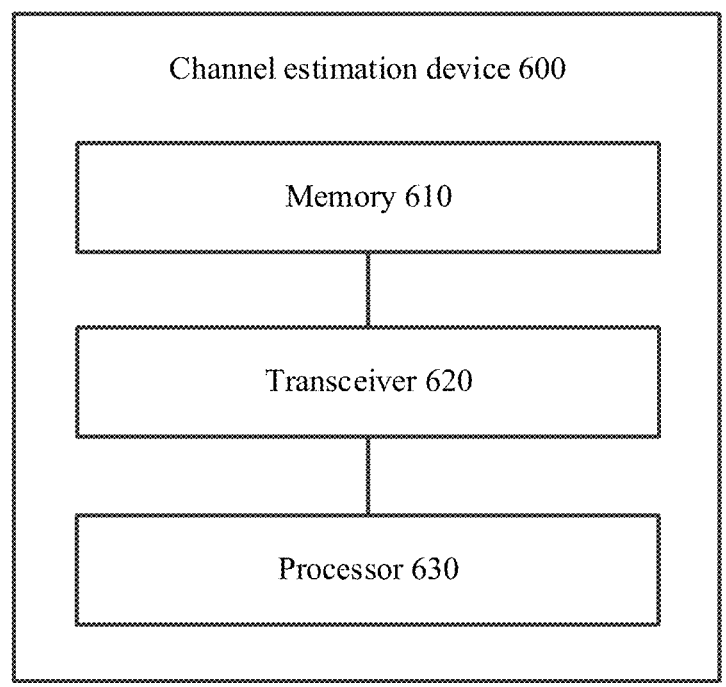
FIG. 14 is a schematic block diagram of a channel estimation device according to an embodiment of the present disclosure.

FIG. 14 is a schematic block diagram of a channel estimation device according to an embodiment of the present disclosure. The channel estimation device 600 in FIG. 14 includes a memory 610, a transceiver 620 and a processor 630.

The memory 610 is configured to store a program.

The transceiver 620 is configured to receive an uplink pilot signal that is sent by another device through antenna ports in a first antenna port set.

The transceiver 620 is further configured to receive preprocessed uplink control information that is sent by the another device through at least some antenna ports in the first antenna port set.

The processor 630 is configured to execute the program stored in the memory 610. When the program is executed, the processor 630 is configured to perform channel estimation according to the uplink pilot signal to determine uplink channel information.

The processor 630 is further configured to demodulate the preprocessed uplink control information according to the uplink channel information.

The channel estimation device 600 is equivalent to the second device as described above.

In this embodiment of the present disclosure, the preprocessed uplink control information is transmitted through some or all of the antenna ports used for transmitting the uplink pilot signal, so that the channel estimation device can perform channel estimation on an uplink channel and demodulation of the uplink control information according to the uplink pilot signal. That is to say, the measurement of the uplink channel information and the demodulation of the uplink control information by the channel estimation device are implemented by using one uplink pilot signal. Therefore, signaling and resource overheads are reduced.

Optionally, in an embodiment, the uplink pilot signal is a signal on which the preprocess is not performed.

Optionally, in an embodiment, the processor 630 is further configured to:

determine the preprocess which is performed by the another device on the uplink control information, where the preprocess includes at least one of pre-coding, transmit diversity processing, filtering, and windowing; and demodulate the preprocessed uplink control information sent by the first device according to the uplink channel information and the preprocess which is performed by the first device on the uplink control information.

Optionally, in an embodiment, a transmission bandwidth of the uplink pilot signal includes a transmission bandwidth of the preprocessed uplink control information.

Optionally, in an embodiment, a resource density of a frequency domain resource used for transmitting the uplink pilot signal is smaller than a resource density of a frequency domain resource used for transmitting the preprocessed uplink control information.

Optionally, in an embodiment, a time domain resource used for transmitting the uplink pilot signal is adjacent to a time domain resource used for transmitting the preprocessed uplink control information.

Optionally, in an embodiment, a time domain resource used for transmitting the preprocessed uplink control information includes a time domain resource used for transmitting the uplink pilot signal.

Optionally, in an embodiment, the time domain resource used for transmitting the preprocessed uplink control information consists of M time domain resource units, and the time domain resource used for transmitting the uplink pilot signal consists of the first N time domain units or the last N time domain units in the M time domain resource units, where M and N are both integers greater than 0, and M is greater than N.

Optionally, in an embodiment, the processor 630 is further configured to send Downlink Control Information DCI to the first device. The DCI is used for triggering the another device to send the preprocessed uplink control information and the uplink pilot signal to the device.

Optionally, in an embodiment, the processor 630 is further configured to obtain ACK/NACK information of the first device from the uplink pilot signal.

Optionally, in an embodiment, the preprocessed uplink control information and the uplink pilot signal are received by the another device through the same antenna ports.

Optionally, in an embodiment, a scrambling sequence and/or a control information format of the uplink control information is obtained based on a sequence ID carried by the uplink pilot signal.

Persons of ordinary skill in the art may understand that units and algorithm steps in the exemplary embodiments of the present disclosure may be implemented by electronic hardware or a combination of computer software and electronic hardware. Whether the functions are performed by hardware or software depends on particular applications of the technical solutions and design constraint conditions. Persons skilled in the art can use different methods to implement the described functions for each particular application, but it should not be considered that such implementations go beyond the scope of the present disclosure.

It may be clearly understood by persons skilled in the art that, for the purpose of convenient and brief description repeated descriptions are omitted, a detailed working process of the foregoing systems, devices, and units can be found from corresponding descriptions regarding foregoing method embodiments.

It should be understood that the disclosed systems, devices, and methods may be implemented in other manners. For example, the described device embodiments are merely examples. For example, the units are divided based on logical functions in the disclosed embodiments, and the units may be divided in other ways in practice. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may be physically separate or not, and parts displayed as units may be physical units or not, may be located in one position, or may be distributed over a plurality of network units. Some or all of the units may be selected according to actual requirements to achieve the objectives of the solutions of the embodiments.

In addition, functional units in the embodiments of the present disclosure may be integrated into one processing unit, or each of the units may stand alone physically, or two or more units are integrated into one unit.

When the functions are implemented in the form of a software functional unit and sold or used as an independent product, the software may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The descriptions are only exemplary implementations of the present disclosure, but are not intended to limit the protection scope of the present disclosure. Any variations or substitutions readily figured out by persons skilled in the art without departing from the scope disclosed in the present disclosure shall fall within the protection scope of the present disclosure. Therefore, the protection scope of the present disclosure shall be defined by the claims.

What is claimed is:

1. A data transmission method, comprising:
    obtaining an uplink pilot signal and uplink control information;
    determining a bandwidth of the uplink pilot signal and a bandwidth of the uplink control information,
    preprocessing, by a first device, the uplink control information, wherein the bandwidth of the preprocessed uplink control information is equal to the bandwidth of the uplink pilot signal;
    sending the uplink pilot signal and the preprocessed uplink control information to a second device;
    wherein the uplink pilot signal is a signal on which the preprocess is not performed, and the uplink pilot signal is configured for uplink channel estimation and demodulation of the uplink control information;
    wherein preprocessing, by a first device, the uplink control information comprises:
    performing, by the first device, Discrete Fourier Transform (DFT) on the uplink control information.

2. The method according to claim 1, wherein frequency resources allocated to the uplink control information are equal to frequency resources allocated to the uplink pilot signal.

3. The method according to claim 1, wherein a resource density of a frequency domain resource used for transmitting the uplink pilot signal is smaller than a resource density of a frequency domain resource used for transmitting the preprocessed uplink control information.

4. The method according to claim 1, wherein a time domain resource used for transmitting the uplink pilot signal is adjacent to a time domain resource used for transmitting the preprocessed uplink control information.

5. The method according to claim 1, wherein a time domain resource used for transmitting the preprocessed uplink control information comprises a time domain resource used for transmitting the uplink pilot signal.

6. The method according to claim 5, wherein the time domain resource used for transmitting the preprocessed uplink control information comprises M time domain resource units, and a time domain resource used for transmitting the uplink pilot signal comprises the first N time domain units or the last N time domain units in the M time domain resource units, wherein M and N are both integers greater than 0, and M is greater than N.

7. The method according to claim 1, further comprising:
    receiving, by the first device, downlink control information DCI sent by the second device, wherein the DCI is used for triggering the first device to send the preprocessed uplink control information and the uplink pilot signal to the second device.

8. The method according to claim 1, wherein the uplink pilot signal carries ACK/NACK information of the first device.

9. The method according to claim 1, wherein the preprocessed uplink control information and the uplink pilot signal are sent by the first device through the same antenna ports.

10. The method according to claim 1, further comprising:
    determining at least one of a scrambling sequence and a control information format of the uplink control information based on a sequence ID carried by the uplink pilot signal.

11. A data transmission method, comprising:
    receiving, by a second device, an uplink pilot signal and preprocessed uplink control information that is sent by a first device, wherein a bandwidth of the preprocessed uplink control information is equal to a bandwidth of the uplink pilot signal, and the uplink pilot signal is a signal on which the preprocess is not performed, and the preprocess is Discrete Fourier Transform (DFT);
    performing, by the second device, channel estimation according to the uplink pilot signal to obtain uplink channel information; and
    demodulating, by the second device, the preprocessed uplink control information according to the uplink channel information.

12. The method according to claim 11, wherein the demodulating, by the second device, the preprocessed uplink control information according to the uplink channel information comprises:
    determining, by the second device, a preprocess which is performed by the first device on the uplink control information; and
    demodulating, by the second device, the preprocessed uplink control information sent by the first device according to the uplink channel information and the preprocess which is performed by the first device on the uplink control information.

13. The method according to claim 11, wherein frequency resources allocated to the uplink control information are equal to frequency resources allocated to the uplink pilot signal.

14. The method according to claim 11, wherein a resource density of a frequency domain resource used for transmitting the uplink pilot signal is smaller than a resource density of a frequency domain resource used for transmitting the preprocessed uplink control information.

15. The method according to claim 11, wherein a time domain resource used for transmitting the preprocessed uplink control information comprises a time domain resource used for transmitting the uplink pilot signal.

16. The method according to claim 11, further comprising:
    sending, by the second device, Downlink Control Information DCI to the first device, wherein the DCI is used for triggering the first device to send the preprocessed uplink control information and the uplink pilot signal to the second device.

17. The method according to claim 11, wherein the preprocessed uplink control information and the uplink pilot signal are received by the second device through the same antenna ports; and
    wherein a scrambling sequence and/or a control information format of the uplink control information is obtained from a sequence ID carried by the uplink pilot signal.

18. A data transmission device, comprising:
    a memory storing program instructions; and
    a processor;
    wherein when the program instructions are executed by the processor, the apparatus is configured to:

obtain an uplink pilot signal and uplink control information;
determine a bandwidth of the uplink pilot signal and a bandwidth of the uplink control information;
preprocessing the uplink control information, wherein the bandwidth of the preprocessed uplink control information is equal to the bandwidth of the uplink pilot signal;
send the uplink pilot signal and the preprocessed uplink control information to a second device;
wherein the uplink pilot signal is a signal on which the preprocess is not performed, and the uplink pilot signal is configured for uplink channel estimation and demodulation of the uplink control information;
wherein preprocessing the uplink control information comprises:
performing, by the first device, Discrete Fourier Transform (DFT) on the uplink control information.

* * * * *